United States Patent
Verkama et al.

(12) 
(10) Patent No.: US 6,741,849 B1
(45) Date of Patent: May 25, 2004

(54) HANDLING OF FORWARDED CALLS

(75) Inventors: Markku Verkama, Espoo (FI); Bo Axerud, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/371,179

(22) Filed: Aug. 10, 1999

(30) Foreign Application Priority Data

Dec. 15, 1997 (FI) .................................................. 974519

(51) Int. Cl.[7] .............................................. H04M 11/00
(52) U.S. Cl. ........................ 455/406; 455/417; 455/428; 455/433; 455/445
(58) Field of Search ................................ 455/406, 407, 455/414, 433, 417; 379/210, 211, 212, 114, 144

(56) References Cited

U.S. PATENT DOCUMENTS 5,539,807 A * 7/1996 Ghisler et al. ................. 379/58
5,621,783 A * 4/1997 Lantto et al. ................. 455/406

FOREIGN PATENT DOCUMENTS

| EP | 0 886 422 A1 | 12/1998 |
| WO | WO 92/22174 | 12/1992 |
| WO | WO 95/31076 | 11/1995 |
| WO | WO 96/20554 | 7/1996 |
| WO | WO 96/20574 | 7/1996 |

* cited by examiner

*Primary Examiner*—Edward F. Urban
*Assistant Examiner*—Temica M Davis
(74) *Attorney, Agent, or Firm*—Squire, Sanders & Dempsey L.L.P.

(57) ABSTRACT

A mobile communication system that proposes a new charging principle, according to which the roaming leg is paid entirely by the party who forwards the call to a mobile subscriber. In an exemplary embodiment, the call is first routed to the exchange of subscriber B, who has forwarded his calls. After determining that the call is to be forwarded to a mobile subscriber C, the exchange routes the call to the gateway mobile switching center (GMSC) capable of making interrogations to the home location register of subscriber C. When the charging record for the call is generated, the called subscriber B is charged for the leg between the GMSC and subscriber C. Thus, subscriber C does not have to pay for calls addressed to subscriber B. To minimize the call costs to subscriber B, as direct a route as possible is preferably used on the leg between the GMSC and subscriber C.

15 Claims, 5 Drawing Sheets

HANDLING OF FORWARDED CALLS

FIELD OF THE INVENTION

This invention concerns the handling of calls that are forwarded to a mobile telephone.

BACKGROUND OF THE INVENTION

Call transfer is one of the most commonly used services in modern telecommunication networks. In the service a subscriber can specify that calls destined to him are to be forwarded to another subscriber's number. For example, Beth can transfer her calls to Cindy when leaving her home to visit Cindy. A subscriber can specify that his calls be forwarded in various situations. For example, when the CFU (Call Forwarding Unconditional) service is activated, all the calls destined to the subscriber are forwarded to a given number. In the CFB (Call Forwarding on Busy) service, calls are forwarded if the called subscriber is busy. By activating the CFNRy (Call Forwarding on No Reply) service, the subscriber instructs that his calls are to be forwarded after 4 alert tones, for example, if the call is not answered before that. For mobile subscribers the CFNRc (Call Forwarding on Not Reachable) service can be defined. In CFNRc the calls are forwarded if the subscriber is not in the coverage area of the mobile telecommunication network, or if he has turned his mobile station off.

The routing of forwarded calls, as well as the charging principle for forwarded calls, are shown in FIG. 1. In the figure, the calling party A makes a call to B. B has forwarded his calls to C. This is done by giving the exchange of B instructions to forward the calls addressed to B to a third party C. Both B and C are fixed network subscribers. A may be a fixed network subscriber or a mobile network subscriber. The call is first routed from A via his Local Exchange LE(A) to the local exchange LE(B) of B. Information concerning the specified call forwarding is stored in LE(B). In response to having received the request for call establishment from LE(A), LE(B) notices that the call is to be forwarded to C. In response to that, LE(B) routes the call to the forwarded to party C via the local exchange LE(C) of C. LE(B) becomes the transit point of the call. The first call leg from A to LE(B) is paid by subscriber A. The forwarded leg from LE(B) to C is paid by subscriber B.

In FIG. 2 is shown a situation where the call is forwarded to mobile subscriber. In the example, both A and B subscribers are fixed network subscribers. However, they can also be mobile subscribers without causing any remarkable changes in the process. When compared to the case shown in FIG. 1, the only difference is the leg between LE(B) and subscriber C. This is due to the basic feature of mobile telecommunication systems: the location of the subscriber is not fixed. Therefore, the location of the subscriber has to be ascertained before establishing the connection.

In modern mobile telecommunications networks, the network maintains information about the location of the mobile subscribers. In the GSM network used as an example in this application, this information is distributed between the home location register HLR and visitor location registers VLR directly connected to mobile switching centers MSC. The HLR is in the home network of the mobile subscriber and contains the unchanging subscriber information and the location information of the mobile subscriber with an accuracy of one VLR area. The VLR area typically equals the area served by one mobile switching center. The VLR of the visited mobile switching center VMSC responsible for the area the subscriber is currently visiting contains more exact information about the subscriber's location.

On the leg from LE(B) to subscriber C, the call is first routed to the Gateway Mobile Switching Center GMSC(C) of subscriber C. GMSC(C) is basically any MSC capable of making interrogations to the home location register HLR(C) of subscriber C. In response to having received the HLR inquiry, i.e. the query for routing information, the HLR ascertains the VLR the subscriber is currently visiting, and sends that VLR, i.e. VLR(C), a request PRN (Provide Roaming Number) for a roaming number.

In response VLR(C) returns HLR(C) a roaming number MSRN (Mobile Subscriber Roaming Number) identifying the called subscriber in this VLR. HLR(C) forwards the roaming number to GMSC(C). GMSC(C) adds to the call record comprising information of the call information that subscriber C is receiving the call in the area on VLR(C). Using the received identification MSRN and the message IAM(MSRN) (IAM=Initial Address Message), GMSC(C) establishes a connection to the MSC VMSC(C) currently visited by subscriber C. To identify the called subscriber corresponding to the received roaming number with his identity number IMSI or TMSI (Temporary Mobile Subscriber Identity) VMSC(C) queries VLR(C), which then returns this information. According to the specifications, this is done using messages SIFIC (Send Info For Incoming Call) and CC (Complete Call). Having ascertained the identity of the called subscriber, VMSC(C) now establishes the final leg of the call to the called subscriber.

In GSM, the basic principle in charging is that the calling subscriber pays the leg between himself and the home network HPLMN(B) (HPLMN=Home Public Land Mobile Network) of the called subscriber. The rest of the route is paid by the called subscriber. The idea here is that the calling subscriber should not have to pay a surprisingly high price for his call, for example, when the called subscriber is roaming in a distant country. According to this principle, when subscriber A in Finland calls a mobile subscriber B whose home network is in New Zealand but who is currently roaming in Finland, the call is routed via New Zealand. Subscriber A pays the leg from Finland to New Zealand and subscriber B the leg from New Zealand back to Finland.

Due to this charging principle, the forwarding subscriber B pays for the leg between LE(B) and the home network of C and subscriber C from his home network onwards. It should be noted that for most operators, reception of calls is free in the home network HPLMN (Home Public Land Mobile Network) of the subscriber. However, when the subscriber is roaming outside his home network, he is charged for the roaming leg from his own home network to the VPLMN (Visited Public Land Mobile Network) he is currently visiting.

The problem with this charging principle is that it is unfair to the mobile subscriber if the call has been forwarded. When the principle is applied, a GSM subscriber who answers a forwarded call is charged for the roaming legs even if he is not the intended recipient of the call. For example, let us consider a situation in which Beth and Cindy travel abroad together. Cindy has a mobile phone, and Beth forwards calls destined to her fixed telephone to Cindy's mobile phone. Now, when Andy calls Beth, Andy is charged for the local telephone call leg of the call. Beth pays the leg from her own exchange to the HPLMN of Cindy, the price of which is the price of a national call to a mobile telephone. Cindy, in turn, pays for the roaming leg, i.e. from her HPLMN to her VPLMN. In many cases, the roaming leg is the most expensive of all the legs of the call. Thus, even if the call is from Andy to Beth, Cindy is the one who is charged the most.

The objective of this invention is to solve the above-mentioned problem of the prior art. This objective is achieved using the method and apparatus specified in the independent claims.

SUMMARY OF THE INVENTION

This invention proposes a new charging principle according to which the roaming leg is paid entirely by the party who forwarded the call to a mobile subscriber.

In an exemplary embodiment, the call is first routed to the exchange of subscriber B, who has forwarded his calls. After determining that the call is to be forwarded to a mobile subscriber C, the exchange routes the call to the gateway mobile switching center GMSC capable of making interrogations to the home location register of subscriber C. The GMSC adds in the call record of the call the information that the call has been forwarded by the called subscriber B.

When generating the charging record for the call, the called subscriber B is charged for the leg between the GMSC and subscriber C. Thus subscriber C does not have to pay for calls addressed to subscriber B. To minimize the call costs to subscriber B, as direct a route as possible is preferably used on the leg between the GMSC and subscriber C. The charging record may be generated in other network elements than the GMSC, such as in the billing center.

BRIEF DESCRIPTION OF THE DRAWINGS

The invention is described more closely with reference to the accompanying schematic drawings, in which.

DETAILED DESCRIPTION OF THE INVENTION

Figure 1:
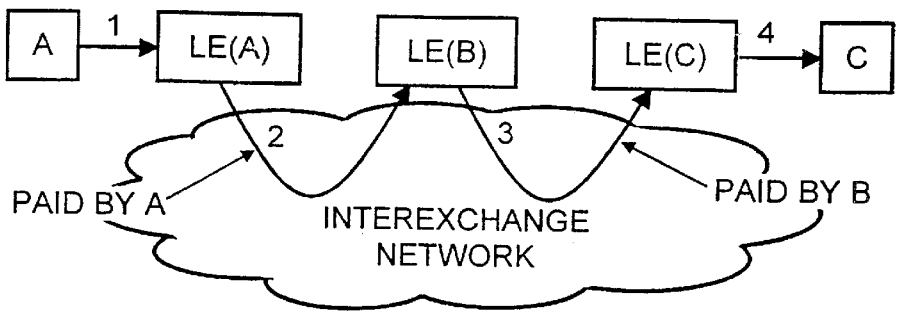
FIG. 1 shows a forwarded call.
Figure 2:
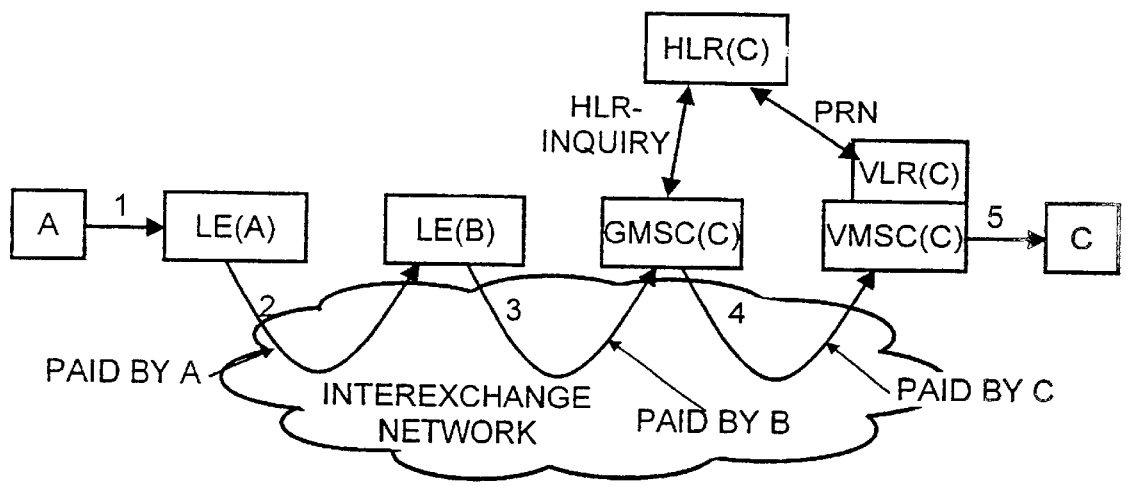
FIGS. 2 and 3 show a call forwarded to a mobile subscriber.
Figure 3:
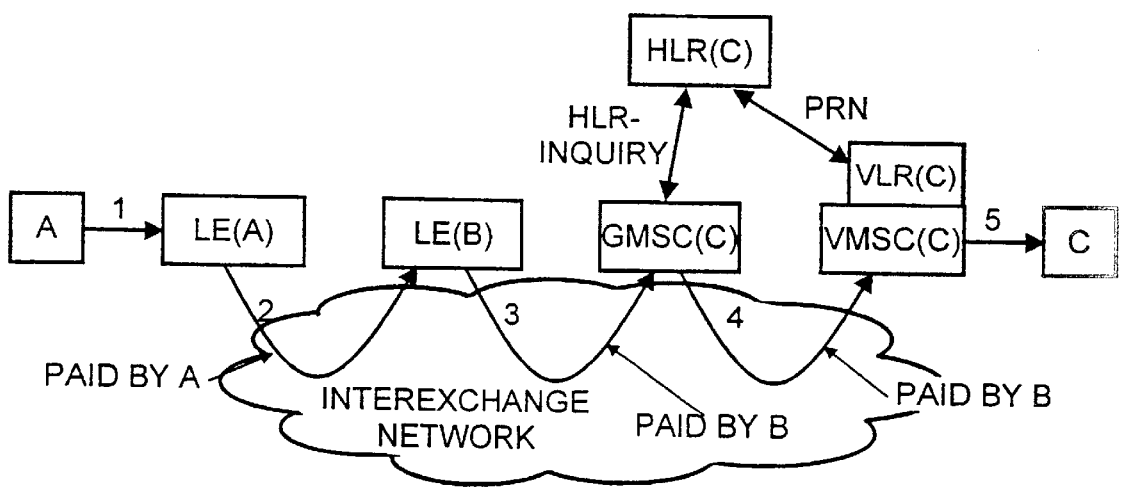

A technical solution for implementing the invention is illustrated below. The exemplary solution assumes that the ISUP (ISDN User Part) signaling protocol is used. However, the chosen signaling protocol has an effect only on the messages used, and the invention can just as well be implemented using, some other signaling protocol.

When using ISUP, the following signaling information concerning forwarded calls can be used:

redirecting indicator: Information sent in either direction, i.e. from the exchange of the forwarding subscriber (the forward direction) or vice versus (the backward direction) indicating whether the call has been diverted or rerouted and whether or not presentation of redirection information to the calling party is restricted.

redirecting number: Information sent in the forward direction when a call is diverted, indicating the number from which the call was diverted.

redirecting reason: Information sent in either direction indicating, in the case of calls undergoing multiple redirections, the reason why the call has been redirected.

redirection counter: Information sent in either direction indicating the number of redirections which have occurred on a call.

redirection indicator: Information sent to indicate whether the call has undergone diversion or rerouting. It also contains information about presentation restrictions.

redirection information: Information sent in either direction giving information about call redirection or call rerouting.

redirection number: Information sent in the backward direction indicating the number to which the call must be rerouted or has been forwarded.

redirection number restriction indicator: Information sent in the backward direction indicating whether the forwarded-to user allows the presentation of his number.

redirection reason: Information sent in the call diversion information parameter and the redirection information parameter to indicate the reason for the redirection.

The signaling information is presented more thoroughly in ITU-T (ITU=International Telecommunication Union, ITU-T=the ITU Telecommunication standardization sector) recommendations Q.762 and Q.763 published by ITU.

For clarity in the example, we shall use the following names for the parties participating in the call:

Andy: the original calling party. Andy may or may not be a GSM subscriber.

Beth: the intended recipient of the call. Beth may or may not be a GSM subscriber. Beth has forwarded her calls to Cindy. In the examples, Beth has instructed that all her calls be forwarded, i.e. she has activated the CFU service.

Cindy: the mobile subscriber who finally answers the call.

Two different situations are to be considered depending on whether the call is routed via the gateway exchange GMSC(C) of Cindy or not. The former is the current GSM practice, but the latter becomes possible with implementation of the optimal routing feature included in GSM phase 2+being currently specified by ETSI (European Telecommunication Standards Institute).

Figure 4:
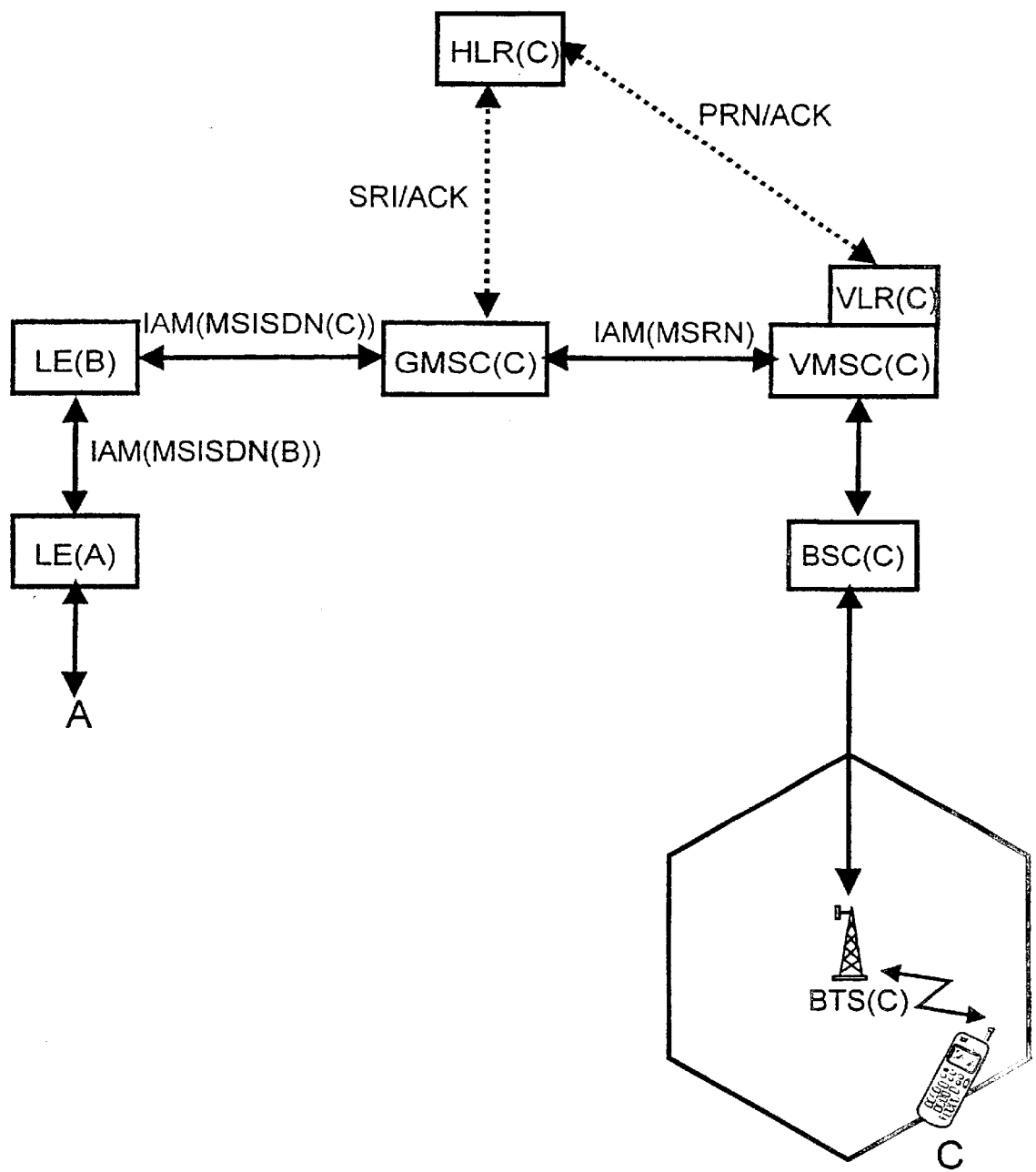
FIG. 4 shows normal routing of a call to a mobile subscriber.

We shall first study the case where optimal routing is not possible. This case is shown in FIG. 4. The procedure starts when Andy dials Beth's phone number. In the call establishment procedure, Andy's exchange LE(A) analyzes the dialed phone number. On the basis of the analysis, the exchange sends Beth's exchange the message IAM(ISDN(B)) requesting the establishment of a connection. In the IAM message, the ISDN number ISDN(B) of Beth is specified as the called party number and the ISDN number of Andy as the calling party number.

In response to having received the IAM message, the exchange LE(B) of Beth consults its database and finds out that Beth has instructed her calls be unconditionally forwarded to Cindy's mobile phone. In response, LE(B) sends the gateway MSC GMSC(C) of Cindy the IAM message IAM(MSISDN(C)). In the message, the redirection indicator shows that the call has been forwarded. The redirecting number is the ISDN number of Beth, and the redirecting reason CFU. The redirection counter has the value 1. The called party number is the MSISDN number MSISDN(C) of Cindy and the calling party number the ISDN number ISDN(A) of Andy.

In response to having received the message IAM (MSISDN(C)), GMSC(C) inspects the redirection number information included in the message. GMSC(C) notes that the call has been forwarded and adds the identity of the forwarding subscriber Beth the generated call record. GMSC(C) sends Cindy's home location register HLR(C) the request SRI (Send Routing Information) for routing information. In response to having received the message, HLR (C) asks the visitor location register VLR(C) connected to the MSC VMSC under which Cindy is currently roaming for a roaming number MSRN (Mobile Station Roaming Number). VLR(C) returns the MSRN, and HLR(C) forwards the MSRN to GMSC(C). GMSC(C) establishes the connection to VMSC(C) by sending it the message IAM(MSRN), and the VMSC(C) establishes the connection to Cindy's mobile phone C via the base station controller BSC(C) and the base transceiver station BTS(C). The call redirection information included in the message is similar to that included in the IAM message sent from LE(B) to GMSC(C). VMSC(C) includes the information in its call record that the call had been forwarded by Beth.

Having completed the call, the call records generated are sent to the billing center (not shown in the figure) or to some other network element handling the billing information. On the basis of the call records, Beth is also charged for the roaming leg from GMSC(C) to VMSC(C). The only changes in the existing network elements and protocols is the functionality of adding the call record information about the call being forwarded and the identity of the forwarder. In addition, it must be arranged that the billing center charges the forwarder, i.e. Beth, for the roaming leg.

Figure 5:
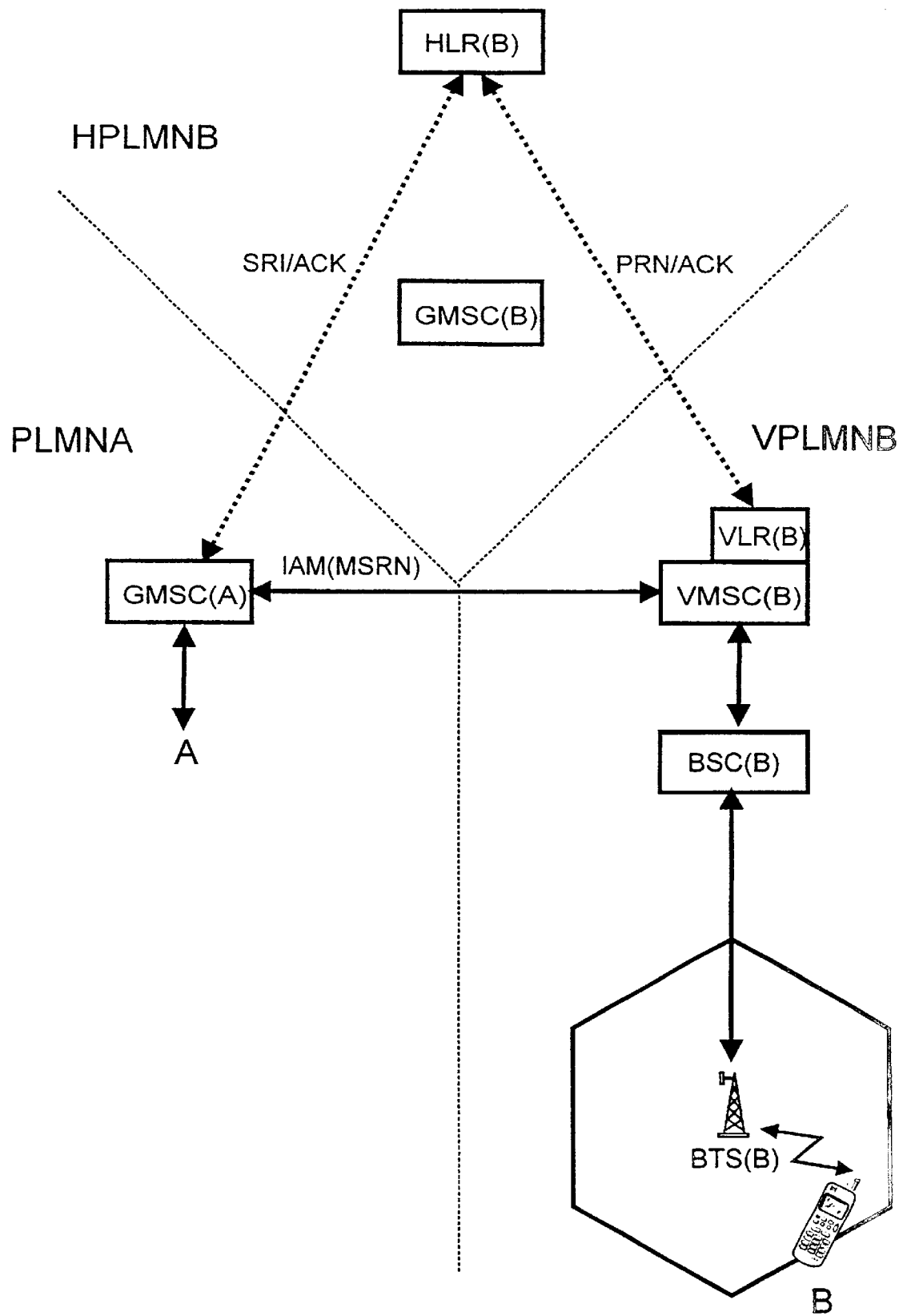
FIG. 5 shows optimal routing of a mobile terminated call.

The use of optimal routing has some influence on the above-mentioned methodology. The method of optimal routing is currently being standardized by ETSI. The method is described in more detail in specifications GSM 02.79 and GSM 03.79 published by ETSI. The basic idea of the optimal routing method is to route the call using the most direct route between subscribers A and B, and is shown in FIG. 5 for nonforwarded calls. Instead of immediately establishing a connection to the gateway MSC GMSC(B) of the home network of the called subscriber, the gateway MSC GMSC(A) of the calling subscriber sends the home location register HLR(B) of the called subscriber the request SRI for routing information. HLR(B) asks the visitor location register VLR(B) of B for a roaming number, and forwards the routing number to GMSC(A). Using the roaming number, GMSC(A) establishes a connection directly to VMSC(B) visited by the called subscriber. Thus, the call is not necessarily routed through the home network of subscriber B, since the home network is contacted in the HLR inquiry only. Using optimal routing, the interexchange call expenses and thus the total call price can be reduced.

GSM MoU (Memorandum of Understanding), an organization of GSM operators, has specified two conditions to be met by the implementation of optimal routing:

1. use of optimal routing may not increase the call price for any subscriber (tariff requirement), and
2. at least in the first phase of the service, one call leg is always paid by one subscriber.

Because the expenses caused by different legs can not be assumed to be known in the first phase of optimal routing, optimal routing is used in the first phase only if both GMSC(A) and VMSC(B) or both VMSC(B) and HLR(B) are in the same country.

The aim of optimal routing is to route the call as directly as possible. Thus, the HLR inquiry requesting information about the location of the subscriber to whom the call is to be forwarded must be made as early as possible in the establishment procedure of the call. If the calling subscriber belongs to the same mobile telecommunications system as the called subscriber, the inquiry can be made by the gateway MSC GMSCA of subscriber A. If the calling subscriber A is not a subscriber of the same mobile telecommunications system as B, the call may be routed to a network element capable of making HLR inquiries.

Figure 6:
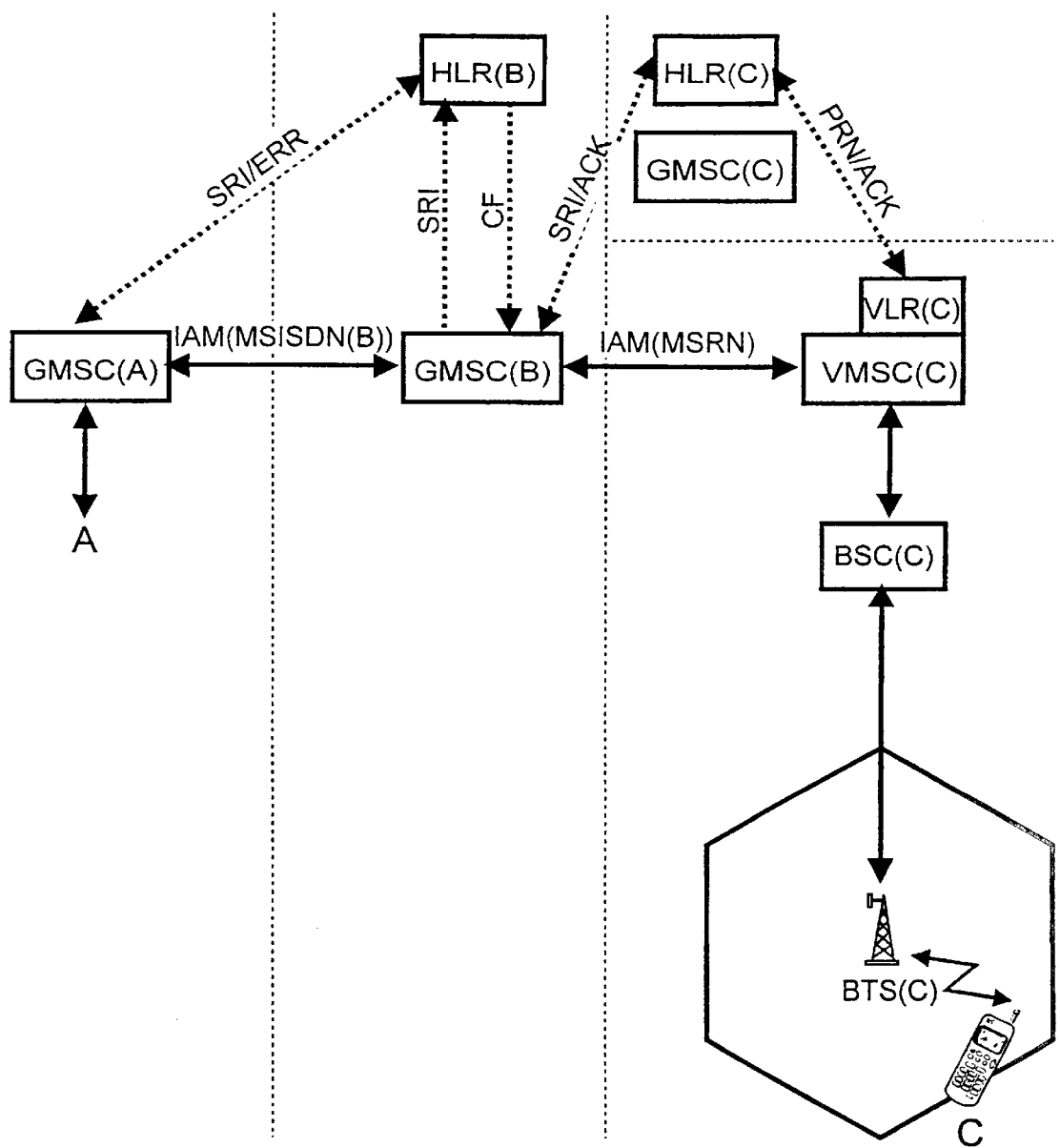
FIG. 6 shows direct routing of a call to a mobile subscriber.

The call establishment procedure according to the invention in a case where optimal routing is possible is shown in FIG. 6. In the figure, Cindy is a mobile subscriber and Andy and Beth are mobile subscribers or subscribers whose exchange is capable of making HLR interrogations. However, for the presented embodiment it is only essential that Beth's exchange is capable of making interrogations to Cindy's HLR without first routing the call to a exchange in Cindy's home network.

Again, the procedure begins when Andy dials Beth's phone number. In response to having received the phone number, Andy's exchange GMSC(A) analyzes the number. If Beth is a fixed network subscriber or Andy's network is not capable of making interrogations to HLR(B), Andy's exchange sends on the basis of the number analysis Beth's exchange the message IAM(ISDN(B)) requesting the establishment of a connection. In the IAM message, the ISND number ISDN(B) of Beth is defined as the called party number and the ISDN number of Andy as the calling party number. On the other hand, if Beth is a mobile subscriber and Andy's network is capable of interrogating the home location register HLR(B) of Beth, HLR(B) is sent a request SRI for routing information.

Generally a call leg is paid by only one subscriber. Therefore, in the preferred embodiment of the present invention the call is always routed via GMSC(B), because the direct route from Andy to Cindy may cost more than the route from Beth to Cindy or more than from Andy to Beth. HLR(B) has no means of knowing where subscriber C is, unless HLR(B)=HLR(C). The decision concerning the tariff requirement can thus not be made by HLR(B).

For the above reason HLR(B) returns GMSC(A) (or Andy's fixed network exchange capable of making HLR interrogations) instructions to route the call to an exchange GMSC(B) in Beth's home network. In response, GMSC(A) sends GMSC(B) the message IAM(ISDN(B)) requesting the establishment of a connection based on the analyses. In the IAM message, the ISDN number ISDN(B) of Beth is specified as the called party number and the ISDN number ISDN(A) of Andy as the calling party number. In response to having received the IAM message, GMSC(B) interrogates HLR(B). HLR(B) returns the call forwarding (CF) data.

GMSC(B) recognizes Cindy's number as a GSM number, and interrogates HLR(C) for a roaming number and routes the call directly to VMSC(C). According to the invention, B pays both the leg from GMSC(B) to the home network HPLMN(C) of Cindy and from HPLMN(C) to C. Thus, direct routing between GMSC(B) and C is always cheaper for B. A method of bypassing the tariff requirement for optimal routing is presented in FI 973996, which at the filing date of the present application is not yet laid open to the public. The basic idea of the invention presented in the referenced application is to specify a condition for routing the call directly which is independent of the tariff requirement for direct routing.

According to one embodiment presented in the referred application, the calls within a pre-specified user group comprising two or more subscribers are always routed directly. Thus, the leg from GMSC(B) to C can be specified as always using the direct route by adding to Cindy's subscriber information stored in HLR(C) a note to bypass the tariff requirement for calls being forwarded by Beth. In another embodiment presented in the referred application, the call is specified to be routed directly on a call per call basis. This can be achieved by adding to the call information a flag indicating that the call is to be routed directly. Thus, GMSC(B) adds a direct routing flag into the call information sent to HLR(C) in the HLR inquiry.

Because the call between GMSC(B) and C is specified as a directly routed call, HLR(C) sends Cindy's visitor location register VLR(C) the request PRN for a roaming number. VLR(C) returns the roaming number MSRN in the message PRN ACK, and HLR(C) relays this to GMSC(B) in the message SRI ACK. GMSC(B) then establishes a connection to VMSC(C) directly using the received MSRN. In addition, GMSC(B) adds to the call information a notification that the call has been forwarded by Beth.

When the call is completed, the call records generated are sent to the billing center (not shown in the figure) or to some other network element handling the billing information. On the basis of call records, Beth is charged for the whole leg from GMSC(B) to Cindy.

The implementation of the above embodiments of the present invention does not require changes in existing protocols but only to GMSC and HLR functionalities. If the call records generated in current switches contain suitable call forwarding information, part of the implementation can be done in the billing center. A billing center according to the invention is adapted to receive call records from switching elements and to charge subscriber B for all the call legs between the transit point and subscriber C.

In yet another embodiment of the present invention there are means for signaling the information that the call is to be forwarded by Beth to HLR(C). In this case, the call can be routed directly to subscriber C without passing via the home network of subscriber B. Implementations of this embodiment are shown in FIGS. 7 and 8.

Figure 7:
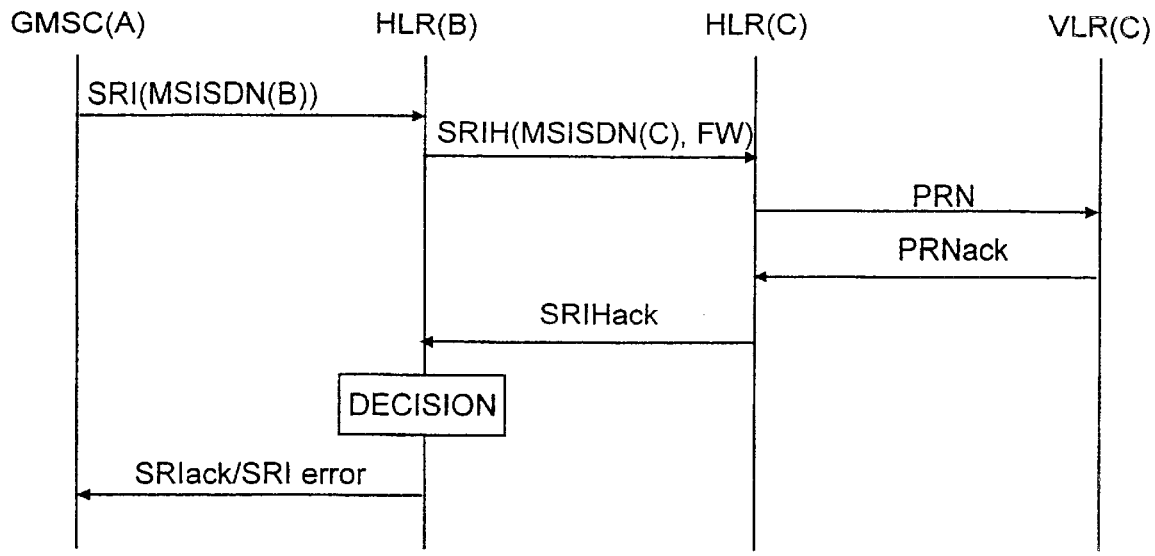
FIGS. 7 and 8 show signaling of call establishment procedure.

In the embodiment shown in FIG. 7, GMSC(A) first sends HLR(B) the request SRI(MSISDN(B)) for routing information identifying the called subscriber B. In response to having received the message HLR(B) determines that the called subscriber B has forwarded his calls to subscriber C. In response to this HLR(B) sends directly to HLR(C) the request SRIH(MSISDN(C), FW) for routing information determining that the incoming call has been forwarded to subscriber C by subscriber B. Having received this request HLR(C) determines the current VLR address VLR(C) of subscriber C and sends VLR(C) the request PRN for a roaming number. VLR(C) returns the roaming number to HLR(C), which forwards it to HLR(B) in the message SRIHack. HLR(B) checks whether the direct route meets the tariff requirement, i.e. that in using the direct route neither Andy or Beth would have to pay more than they would have to pay when using the indirect route passing via GMSC(B): In the first phase of optimal routing, this requirement is met if the direct route from GMSC(A) to Cindy is cheaper than the leg from GMSC(A) to GMSC(B). If the tariff requirement is met, HLR(B) forwards the roaming number to GMSC(A) in the message SRIack. In response to having received this message GMSC(A) establishes the connection to subscriber C using a direct route. If the requirement is not met HLR(B) sends GMSC(A) the message SRI error, in response to which GMSC(A) establishes a connection to the gateway exchange GMSC(B) of subscriber B. GMSC(B) continues the routing procedure as presented earlier in this application.

Figure 8:
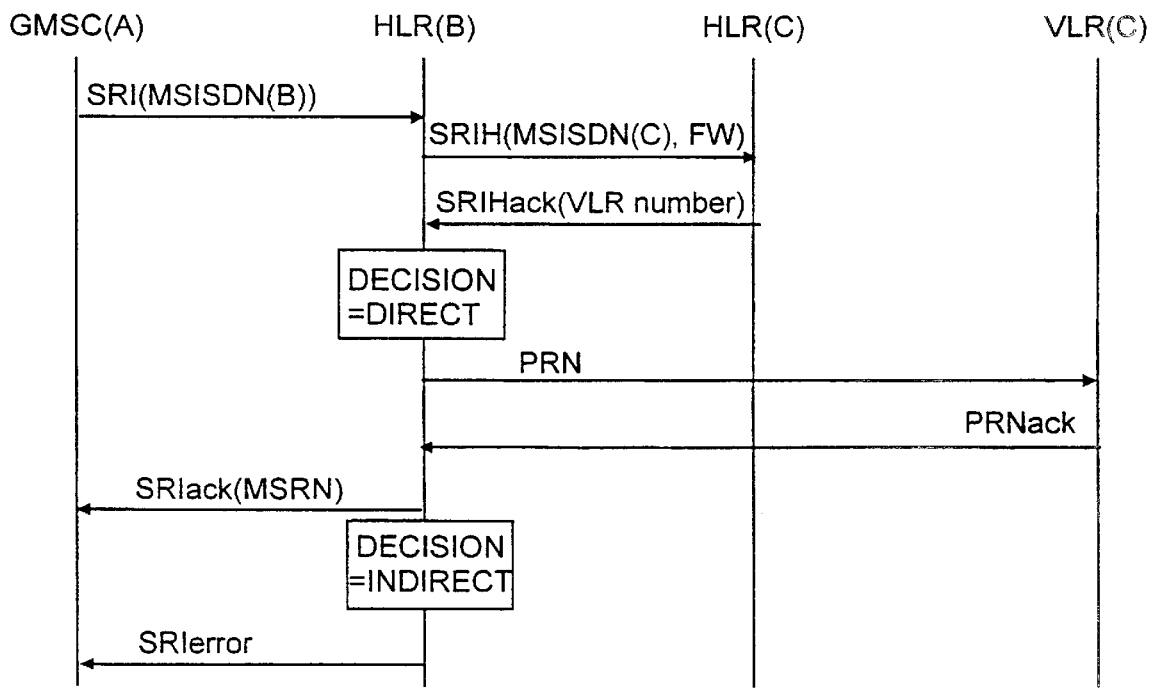

In the embodiment shown in FIG. 8, GMSC(A) sends HLR(B) the request SRI(MSISDN(B)) for routing information. HLR(B) determines that the called subscriber B has forwarded his calls to subscriber C and sends to HLR(C) the request SRIH(MSISDN(C), FW) for routing information just as in FIG. 7. Having received this request HLR(C) determines the current VLR address VLR(C) of subscriber C and returns the address VLR(C) to HLR(B) in the message SRIHack. HLR(B) checks whether the direct route meets the tariff requirement, i.e. that in using the direct route, neither Andy or Beth would have to pay more than they would have to pay when using the indirect route passing via GMSC(B). If this requirement is met, HLR(B) sends VLR(C) the request PRN for a roaming number. VLR(C) sends the roaming number to HLR(B), which forwards it to GMSC(A) in message SRIack. In response to having received this message GMSC(A) establishes the connection to subscriber C using a direct route. If the requirement is not met HLR(B) sends GMSC(A) the message SRI error, in response to which GMSC(A) establishes a connection to the gateway exchange GMSC(B) of subscriber B. GMSC(B) continues the routing procedure as presented earlier in this application.

It must be noted that the embodiments of FIGS. 7 and 8 are not consistent with current GSM specifications, which have no mechanisms for dialogs between two home location registers.

In the above exemplary embodiments, the invention is implemented in a system utilizing the ISUP protocol. However, the scope of the invention is not limited to systems utilizing ISUP protocol. The only limitation concerning the signaling protocols is that the protocols used must provide a means for transferring between the exchanges the necessary information about the forwarded call. Likewise, although used in the examples, subscriber C does not necessarily have to be a GSM subscriber, as in the examples. He may as well be a subscriber of any other mobile telecommunication network using similar charging principles. The invention can be used with any call forwarding service, and is not limited to the CFU service used in the examples.

What is claimed is:

1. A method of handling calls forwarded from a subscriber of a first network to a subscriber of a mobile telephone network, the mobile telephone network comprising mobile subscribers and location registers in which information about the location of the mobile subscribers is registered, subscriber B, who belongs to the first network, has forwarded subscriber B's incoming calls to mobile subscriber C, the information of subscriber B being stored in the first network, and the information of subscriber C being stored in a location register(C), wherein as a response to a call addressed to subscriber B the method comprising:

routing the call to a gateway exchange capable of interrogating the location register(C), determining the gateway exchange that the call is to be forwarded to subscriber C, sending to the location register(C) a request for routing information, receiving from the location register(C) information about the current location of subscriber C, checking in the first network whether using a direct route between the gateway exchange and subscriber C minimizes the call costs for subscriber B, and, if using the direct route does minimize the call costs for subscriber B, returning from the first network to the gateway exchange routing information for routing the call directly from the gateway exchange to subscriber C, generating a call record comprising information about the call, the call record being added a notification that the call has been forwarded by subscriber B, and charging subscriber B for the leg between the gateway exchange and subscriber C.

2. The method according to claim 1, wherein the call is routed via a network element of the first network, the network element becoming the transit point for the call.

3. The method according to claim 2, wherein the call is routed from the transit point to an interrogating network element being capable of making interrogations of the location register(C), and from that network element directly to subscriber C, without passing via the location register(C).

4. The method according to claim 3, wherein the location register(C) is added instructions to always route calls forwarded by subscriber B using as direct a route as possible, the interrogating network element sends the location register(C) a query for routing information, the location register(C) returns the interrogating network element routing information routing the call using a direct route, and the call is routed using the direct route.

5. The method according to claim 3, wherein the interrogating network element sends the location register(C) a query for routing information, specifying in the query that the call is to be routed using as direct a route as possible in all cases, the location register(C) returns the interrogating network element routing information to route the call using a direct route, and the call is routed using the direct route.

6. The method according to claim 2, in a system comprising a billing center for handling billing data, wherein the call record is sent to the billing center, and in the billing center subscriber B is charged for all the call legs between the transit point and subscriber C.

7. The method according to claim 1, wherein the call is routed directly to subscriber C without passing via the first network.

8. The method according to claim 1, wherein the first network is a mobile telephone network and subscriber B is a mobile subscriber.

9. The method according to claim 7 in a system comprising a billing center for handling billing data, wherein the call record is sent to the billing center, and in the billing center subscriber B is charged for all the call legs not charged from the calling subscriber.

10. A telecommunication system comprising subscribers, location registers storing subscriber information such as the location of mobile subscribers, and switching elements such as gateway exchanges, the gateway exchanges being capable of interrogating the location registers, subscriber B, who belongs to a first network, has forwarded subscriber B's incoming calls to mobile subscriber C, the information of mobile subscriber C being stored in a location register(C), and as response to a call destined to subscriber B, the call is routed to a gateway exchange capable of interrogating the location register(C) and from the gateway exchange to subscriber C, and a call record comprising information about the call is generated, wherein the telecommunication system is adapted to:

route the call to a gateway exchange capable of making interrogations to the first network, send from the gateway exchange to the first network a request for routing information, determine in the first network that the call is to be forwarded to subscriber C, and in response to that to send from the first network to the gateway exchange a message causing the gateway exchange to route the call to a second gateway exchange located in the first network, route the call to the second gateway exchange, route the call from the second gateway exchange to subscriber C.

generate call records in switching elements, and charge subscriber B for all the call legs between the gateway exchange and subscriber C.

11. The telecommunication system according to claim 10 further comprising a location register which is adapted to:

determine whether using a direct route between the gateway exchange and subscriber C minimizes the call costs for subscriber B, and, if using a direct route minimizes the call costs for subscriber B, return to the gateway exchange routing information for routing the call directly from GMSC(A) to subscriber C.

12. The telecommunication system according to claim 10 further comprising a billing center which is adapted to receive call records from the switching elements and to charge subscriber B for all the call legs between the gateway exchange and subscriber C.

13. A telecommunication system comprising subscribers, location registers storing subscriber information such as the location of mobile subscribers, and switching elements such as gateway exchanges, the gateway exchanges being capable of interrogating the location registers, subscriber B, who belongs to a first network, has forwarded subscriber B's incoming calls to mobile subscriber C, the information of mobile subscriber C being stored in a location register(C), and as response to a call from a calling subscriber A destined to subscriber B, the call is routed to a gateway exchange capable of interrogating the location register(C) and from the gateway exchange to subscriber C, and a call record comprising information about the call is generated, wherein the telecommunication system is adapted to:

route the call to a gateway exchange capable of making interrogations to the first network, send from the gateway exchange to the first network a request for routing information, determine in the first network that the call is to be forwarded to subscriber C, send from the first network to the location register(C) a request for routing information, return from the location register(C) to the first network information about the current location of subscriber C, define in the first network whether using a direct route between the gateway exchange and subscriber C minimizes the call costs for subscribers A and B, and return from the first network to the gateway exchange routing information for routing the call directly from a gateway exchange of subscriber A GMSC(A) to subscriber C, if using a direct route minimizes the call costs for subscriber B.

14. The telecommunication system according to claim 13 further comprising a location register which is adapted to:

receive a request for routing information from a gateway exchange, determine that the call is to be forwarded to subscriber C, send to location register(C) a request for routing information, receive from location register(C) information about the current location of subscriber C, determine whether using a direct route between the gateway exchange and subscriber C minimizes the call costs for subscriber B, and, if using a direct route minimizes the call costs for subscriber B, and return to the gateway exchange routing information for routing the call directly from GMSC(A) to subscriber C.

15. The telecommunication system according to claim 13 further comprising a billing center which is adapted to
receive call records from the switching elements and to charge subscriber B for all the call legs between the gateway exchange and subscriber C.

* * * * *

UNITED STATES PATENT AND TRADEMARK OFFICE
CERTIFICATE OF CORRECTION

PATENT NO.    : 6,741,849 B1  
DATED         : May 25, 2004  
INVENTOR(S)   : Markku Verkama and Bo Axerud It is certified that error appears in the above-identified patent and that said Letters Patent is hereby corrected as shown below:

<u>Title page,</u>
Insert Item -- Related U.S. Application Data
   [63] Continuation of application No. PCT/FI98/00969, filed on December 11, 1998. --

Signed and Sealed this

Twenty-sixth Day of October, 2004

JON W. DUDAS
*Director of the United States Patent and Trademark Office*